(12) United States Patent
Altman et al.

(10) Patent No.: US 7,682,997 B2
(45) Date of Patent: Mar. 23, 2010

(54) BARRIER LAMINATES AND ARTICLES MADE THEREFROM

(75) Inventors: Michael Altman, Kennett Square, PA (US); Susie Enache, Lincoln University, PA (US); Michael Magyar, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/187,399

(22) Filed: Jul. 21, 2005

(65) Prior Publication Data

US 2007/0021023 A1    Jan. 25, 2007

(51) Int. Cl.
*B32B 27/12* (2006.01)
*B32B 27/32* (2006.01)

(52) U.S. Cl. .................. 442/397; 442/85; 442/86; 442/88

(58) Field of Classification Search .......... 442/85, 442/86, 88, 289, 319, 364, 381, 394, 397; 428/365, 373
See application file for complete search history.

(56) References Cited

U.S. PATENT DOCUMENTS

| 4,194,041 | A |   | 3/1980 | Gore et al. | 428/315 |
| 4,532,316 | A |   | 7/1985 | Henn | 528/59 |
| 4,731,283 | A | * | 3/1988 | Sakane et al. | 442/307 |
| 4,927,698 | A | * | 5/1990 | Jaco et al. | 428/198 |
| 4,943,473 | A | * | 7/1990 | Sahatjian et al. | 442/289 |
| 4,996,099 | A | * | 2/1991 | Cooke et al. | 442/4 |
| 5,026,591 | A | * | 6/1991 | Henn et al. | 428/198 |
| 5,928,971 | A |   | 7/1999 | Ellis | |
| 5,948,708 | A |   | 9/1999 | Langley | |
| 6,018,819 | A |   | 2/2000 | King | |
| 6,146,759 | A | * | 11/2000 | Land | 428/370 |
| 6,562,741 | B1 | * | 5/2003 | Lilani | 442/301 |
| 2003/0104741 | A1 | * | 6/2003 | Kelmartin et al. | 442/164 |

FOREIGN PATENT DOCUMENTS

| EP | 1 147 719 A2 | 10/2001 |
| JP | 61-27245 | 2/1986 |
| WO | WO2004/019712 A | 3/2004 |

* cited by examiner

*Primary Examiner*—Norca L Torres-Velazquez
(74) *Attorney, Agent, or Firm*—Dianne Burkhard

(57) ABSTRACT

This invention relates to the production of durably liquid-proof laminates and articles made therefrom, the laminates incorporating a barrier layer and a textile made from a composite yarn containing a core including fiberglass as a strength component and a sheath of a different material around the core. Shelters and other protective articles incorporating this laminate are also described.

57 Claims, 2 Drawing Sheets

BARRIER LAMINATES AND ARTICLES MADE THEREFROM

FIELD OF THE INVENTION

This invention relates to the production of durably liquidproof laminates incorporating a barrier layer and a textile made from a composite yarn containing fiberglass as a strength component.

BACKGROUND OF THE INVENTION

The use of coated textile composites or laminates of textiles and liquid protective barrier membrane layers to create liquidproof protective apparel is well known in the industry. The most common of these applications is waterproof breathable apparel. Typical examples are laminate materials sold by W. L. Gore and Associates, Inc. under the registered trade name GORE-TEX, which contain a waterproof breathable film laminated, or bonded, to one or more textile layers. These laminates are fabricated into apparel and sold as GORE-TEX® garments and the like.

In the particularly demanding arenas of fire and safety service, and even chemical protective applications, the need for textiles which can withstand these more rigorous environments introduces challenges in forming laminated structures that retain liquidproofness even after flexing and abrasion during use. For example, textiles with enhanced fire resistance such as fiberglass, aramids, and the like, tend to be higher in weight and lower in flexibility. Furthermore, the composition of the textiles themselves can introduce additional challenges in bonding, or lamination, to create a durable bond between the barrier layer and the textile material. In addition, fiberglass textiles tend to be less flexible and subject to breaking during flexing, whereby the broken fibers can penetrate the barrier layer and compromise the liquidproofness of the laminates and resulting articles.

Textiles containing woven and non-woven glass fibers have in the past been bonded to PTFE and other polymeric materials to provide improved water resistance, UV stability, strength, etc., in applications such as roofing materials and other structural applications where the resulting material is not subject to significant flexing in use and durable liquidproofness is not as critical as in applications where human life can be put at risk in the event of material failure. For example, JP 61027245, in the name of Japan Gore-Tex, Inc., describes a continuously porous PTFE film laminated on a fabric woven with threads of glass fiber. Other similar references exist to such structural materials.

In the field of fire and safety service, fiberglass containing fabrics have not found widespread use because of the limitations of laminates comprising these fabrics to maintain barrier properties after flexing. Most textiles used in this application are aramids which have weight, manufacturing, cost, and lamination disadvantages.

Accordingly, a need has existed for lightweight, strong, flexible and durably liquidproof laminates including a barrier layer which can be readily formed into liquidproof articles to meet a wide range of demanding environmental conditions.

SUMMARY OF THE INVENTION

Definitions

As used herein, these terms are defined as follows:

"Laminate" is a flexible article comprised of multiple flexible layers resulting in a composite.

"Barrier layer" or "functional layer" or "protective layer" (or "film") are defined as a film or coating that provides a barrier to liquid water penetration as a minimum, and ideally to a range of liquid and vapor chemical challenges and biological challenges. The layer is considered liquidproof if it prevents liquid water penetration against a pressure of at least 0.07 bar for a duration of at least 3 minutes. The protective layer material preferably guarantees prevention of liquid water penetration at pressure of more than 0.07 bar. The prevention of liquid water penetration at a certain pressure is measured on a liquidproof panel based on the same conditions described with respect to the Suter Test for Liquidproof Seams, described herein.

"Seam" is defined as the area where 2 or more pieces or panels of laminate are joined together by sewing, gluing or other mechanical joining "Liquidproof seam" is a seam that will not leak or weep liquid when challenged with a test fluid at a pressure of at least 0.07 bar for a duration of at least 3 minutes. The test fluid is at a minimum water, and ideally can be a range of liquid chemicals.

"Core" is one or more continuous or staple filaments that are aligned essentially parallel to the yarn length.

"Sheath" is one or more continuous or staple filaments that are wrapped or otherwise oriented around the core providing at least partial coverage of the core.

"Breathable" is defined as having the ability to transport moisture vapor through a material.

"Cover factor" or "coverage factor" is a measure of the open nature of the weave in a woven textile and is defined as:

$$*CFtotal = CFm + CFt$$

$$CFm = \sqrt{Fm} \times Dm, \quad CFt = \sqrt{Ft} \times Dt$$

CFm: Cover factor of the warp thread
CFt: Cover factor of the weft thread
Fm: Fineness of the warp thread (dtex)
Ft: Fineness of the weftthread (dtex)
Dm: Density of the warp thread (count/2.54 cm)
Dt: Density of the weft threads (count/2.54 cm)

The present invention is directed to lightweight, strong, flexible and durably liquidproof laminates including a barrier layer which can be readily formed into liquidproof articles to meet a wide range of demanding environmental conditions. Specifically the present invention is directed to laminates incorporating at least one barrier layer and at least one textile layer, the textile layer being made from yarns having a core which includes fiberglass as a strength component and a sheath of a second material around the core. The composition of the sheath may be tailored depending on the desired end use, and may include synthetic or natural materials. For example, in one embodiment, the sheath may be polymeric in nature.

It was surprisingly discovered that durably liquidproof laminates could be made from the components described which could be repeatedly flexed without damaging the barrier layer and compromising the liquidproofness of the laminate. Particularly, laminates of the present invention can be tailored to be liquidproof after being subjected to 20,000 flex cycles, as described in more detail herein, even more preferably after 40,000 flex cycles, and even more preferably after 70,000 flex cycles.

Suitable protective, or barrier, layers of the present invention include those having a thickness of about 200 microns or less, more preferably about 100 microns or less, and even 50 microns or less, and even down to as thin as 20 microns or less. The composition of the barrier layer can be any suitable to the end use. In one embodiment, the barrier layer is a fluoropolymer such as PTFE, and even an expanded PTFE is contemplated. The barrier layer may be breathable or non-breathable, again depending on the desired end use.

Suitable textile layers for the invention may comprise woven, nonwoven or knit constructions. In one embodiment of the invention, a suitable textile layer comprises a woven textile with a total cover factor of about 1800 or less, and in an alternate embodiment a total cover factor of 1400 or less.

Laminates of the present invention can be tailored to have any desired strength/weight ratio appropriate for a desired end result. For example, laminates of the present invention can be tailored to have a strength/weight ratio of greater than 13:1 in one embodiment of the present invention. In further embodiments, strength/weight ratios of greater than 17:1, and even greater than 25:1 are achievable. Weights of the laminates can, again, be tailored to a desired end result, but typically are in the range of about 15 oz/yd2 or less, and can be as low as about 10 oz/yd2 or less, and even about 8 oz/yd2 or less. Additionally, depending on the environment in which the laminates and articles will be used, flame resistance may be incorporated as a feature of these unique materials. Additionally, the laminates and articles of the present invention may be tailored to maintain chemical vapor permeation resistance after 10,000 flex cycles, and even after as many as 20,000 flex cycles.

Articles of the present invention may be fabricated into a variety of configurations which take advantage of the unique properties of the novel laminates of this invention. Liquidproof seaming techniques apparent to those of skill in the art may be used to assemble laminate panels into desired configurations which maintain the beneficial liquidproofness features in the final assembled structure. For example, it is contemplated that suitable articles include tents and other protective shelters, shelter liners, garments, equipment and supply covers and other such protective articles.

DETAILED DESCRIPTION OF THE INVENTION

Figure 1:
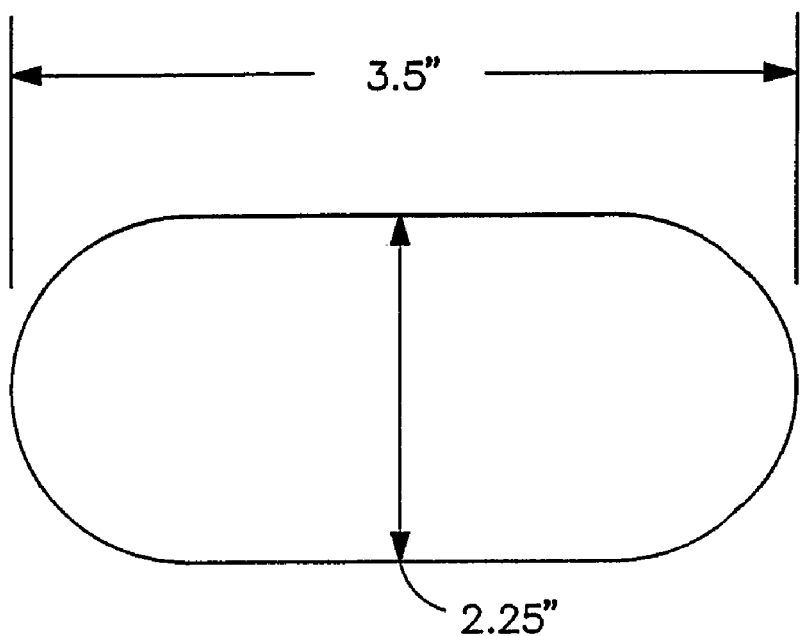
FIG. 1 shows schematically the sample test area used to test laminate samples in accordance with the Suter Test for Liquidproof Fabrics, described herein.

The unique laminates and articles of the present invention provide a number of advantages over conventional materials. Particularly, the present invention provides lightweight, strong, flexible and durably liquidproof laminates which can be fabricated into a variety of structures and articles which can withstand a wide range of demanding environmental conditions.

As noted earlier, the present invention is directed to laminates incorporating at least one barrier layer and at least one textile layer, the textile layer being made from yarns having a core which includes fiberglass as a strength component and a sheath of a second material around the core. The composition of the sheath may be tailored depending on the desired end use, and may include synthetic or natural materials. Suitable materials which can be incorporated with the fiberglass component of the textile yarns can include, but are not limited to, polyester, nylon, modacrylic, meta-aramid, para-aramid, fluoropolymers, viscose rayon, poly-p-phenylenebenzo-bisoxazole (PBO), polybenzimidazole (PBI), polyacrylonitrile (PAN), cotton, wool, silk, polyethylene, acrylic, and the like. Depending on the desired characteristics, the core may be only fiberglass or a blend of fiberglass with other materials. The sheath component of the yarn is at least partially around the core, and may be wrapped or otherwise oriented around the core.

Barrier layers suitable for use in the invention include, but are not limited to, such materials as fluoropolymers such as polytetrafluoroethylene (PTFE), polyvinylidene chloride (PVDC), polyvinyl fluoride (PVF), butyl rubber, polyethylene, polypropylene, polyvinyl chloride (PVC), polyvinylidene fluoride (PVDF), polyamide, chlorinated polyethylene, chlorosulfonated polyethylene, polyethylene terepthalate (PET), ionomers, fluorinated ethylene propylene (FEP), perfluoroalkoxy (PFA), urethane, THV, polyolefin, acrylic, natural rubber, fluoroelastomers, ethylene vinyl acetate (EVA), ethylene tetrafluoroethylene (ETFE), and various forms and combinations thereof. One embodiment of a suitable barrier material for waterproof breathable applications is an expanded polytetrafluoroethylene (ePTFE) layer. Expanded polytetrafluoroethylene is known to be very waterproof and highly breathable. The ePTFE may be provided with a coating of a hydrophilic polymer in known manner.

Lamination of materials for the purposes of this invention may be carried out by any suitable conventional lamination techniques. For example, in one technique, a dot pattern of adhesive may be applied onto one or more of the layers to be joined by a gravure roll, and lamination then occurs by passing the materials between the pressure rollers and curing. Alternatively, a continuous adhesive may be used, whether applied during a continuous lamination process or by batch lamination.

Articles of the present invention may be fabricated into a variety of configurations which take advantage of the unique properties of the novel laminates of this invention. Liquidproof seaming techniques apparent to those of skill in the art may be used to assemble laminate panels into desired configurations which maintain the beneficial liquidproofness features in the final assembled structure. For example, in one embodiment of the invention, referring to FIG. 2, there is shown a tent 10 fabricated from a laminate of the present invention and described in more detail in Example 14. Other protective articles apparent to one of skill in the art are also contemplated as within the scope of the present invention.

Embodiments of the present invention will now be described by way of example only with reference to the following examples.

Test Methods

Newark Flex Method

The flex method was based generally on the description in ASTM D 2097-03, *Standard Test Method for Flex Testing of Finish on Upholstery Leather* with the following exceptions. The pistons moved at a rate of approximately 555 rpm with a stroke of 1.2 inches. The specimen size was 3.25 inches by 4.5 inches. Samples were conditioned at 70+/−2° F. and 65+/−2% RH for at least 24 hours before testing. The closed position distance was set to about 0.5 inches (13 mm). The textile side of the laminate was facing out, away from the pistons. All samples were tested with the fill direction of the fabric parallel to the stroke direction. The sample was not forced into its flexing pattern as per paragraph 8.4 in ASTM D 2097-03 prior to flexing.

Suter Test for Liquidproof Fabrics

To determine whether a sample which was seamed or had undergone Newark flexing or abrasion testing was liquidproof, the Suter test procedure was used. This procedure is based generally on the description in ASTM D 751-00, *Standard Test Methods for Coated Fabrics* (*Hydrostatic Resistance Procedure B*2). This procedure provides a low pressure challenge to the sample being tested by forcing water against one side of the test sample and observing the other side for indication that water has penetrated through the sample.

The test sample was clamped and sealed between rubber gaskets in a fixture that held the sample so that water could be applied to a specific area. For the Newark flexed samples, the area was as depicted in FIG. 1 and was centered on the flexed sample. For abrasion samples, the area to which water was applied was 1.25 inches in diameter, with the abraded location centered within this area. For seamed samples, the area to which water was applied was 4.25 inches in diameter, with the seam centered within this area. The water was applied at a pressure of 1 psig (0.07 bar) to one side of the sample for both seamed and Newark flexed samples, and at a pressure of 10 psig (0.69 bar) to one side of the sample for abrasion samples. In testing laminates with one textile layer, the pressurized water was incident upon the film side. In testing a sealed seam, the seam taped side of the sample was observed for leaks while water was applied to the opposite side.

The seam taped side of the sample was observed visually for any sign of water appearing for 3 minutes. If no water was observed, the sample was deemed to have passed the test and was considered liquidproof.

Chemical Permeation Test

To determine whether a sample which had undergone Newark flexing was still protective against chemical permeation, it was tested according to ASTM F 739-99A, *Standard Test Method for Resistance of Protective Clothing Materials to Permeation by Liquids or Gases Under Conditions of Continuous Contact*. In testing laminates with one textile layer, the test chemical was incident upon the textile side. The testing location was chosen as the center of the flexed area. A gasket comprising a nominally 0.008 inch thick hot melt polyurethane adhesive, having an outer diameter of 1⅝ inches and an inner diameter of 1 inch was applied to the textile side of each sample, with the gasket centered around the testing location. Heat, at 320° F., and pressure were applied for 15 seconds to secure the gasket to the sample. The purpose of this gasket was to enable a sufficient seal between the test fixture and the sample being tested to be formed during testing. 1,3-Butadiene was used as the test chemical in an open loop testing configuration with a test cell diameter of 1 inch. Samples were tested for a pre-specified time of 8 hours. The permeation rate steady state maximum was reported subsequent to testing.

Chemical resistance after flexing is demonstrated when the chemical permeation rate changes by less than 15% when comparing an unflexed sample to the flexed samples.

Abrasion Method

The abrasion test was based generally on the description in ASTM D 3886-99, *Standard Test Method for Abrasion Resistance of Textile Fabrics* (*Inflated Diaphragm Apparatus*). No. 0 emery polishing paper was used as the abradant with the 'standard multi-direction' direction of abrasion. The abradant paper was changed every 150 cycles. A diaphragm without a contact pin was used. Testing was conducted for a pre-specified number of cycles and followed by the Suter test for liquid proof fabrics described herein to characterize liquidproofness after abrasion. Samples were conditioned at 70+/−2° F. and 65+/−2% RH for at least 24 hours before testing.

Grab Break Strength Test

Grab break testing was carried out according to ASTM D 5034-95 *Standard Test Method for Breaking Strength and Elongation of Textile Fabrics* (*Grab Test*) using the 'grab' type of specimen and constant rate of extension. Each clamp had a front jaw having dimensions of 1 inch by 1 inch and a back jaw having dimensions of 1 inch by 3 inches, with the larger dimension perpendicular to the direction of the application of force. Samples were conditioned at 70+/−2° F. and 65+/−2% RH for at least 24 hours before testing.

Vertical Flame Test

Vertical flame resistance was determined according to FED-STD-191A Method 5903, *Flame Resistance of Cloth; Vertical*. Methane gas (99% pure) was used along with a Vertical Flammability Tester (Model 7635A from United States Testing Co., Inc., Hoboken, N.J.). The test specimen size was 3 inches by 12 inches. Samples were conditioned at 70+/−2° F. and 65+/−2% RH for at least 24 hours before testing.

A specimen was said to be flame resistant if the afterflame was less than 2 seconds and the specimen did not melt or drip during the test.

EXAMPLES

Example 1

A laminate was formed comprising a barrier membrane laminated to a textile layer. The barrier membrane was made from polytetrafluoroethylene and is available from W. L. Gore & Associates, Elkton, Md. as part number 10158737. The barrier membrane, which has a thickness of about 0.0018 inches, is resistant to permeation of liquids and vapors. This membrane was laminated on one side, in a manner generally described by U.S. Pat. No. 5,026,591, using a continuous layer of hot melt, moisture curable polyurethane adhesive, prepared according to the teachings of U.S. Pat. No. 4,532,316, with an adhesive laydown thickness of approximately 0.0005 inches, to a woven textile layer weighing about 2.8 ounces per square yard and having a total coverage factor of about 1158. The textile was made from yarns comprising a core of fiberglass and nylon wrapped with a sheath comprising modacrylic and polyester (available from Inman Mills, Inman, S.C. as part number 4-7001-114). The resulting laminate weighed about 4.5 ounces per square yard.

Laminate samples were flexed using the Newark Flex Method from 40,000 to 70,000 cycles. An unflexed sample (Sample 1-1 in Table 1) of the laminate and the flexed laminate samples were tested using the Suter Test for Liquidproof Fabrics. The results are shown below in Table 1. As indicated, the flexed samples showed no change in liquidproofness when measured using the Suter Test for Liquidproof Fabrics.

TABLE 1

| Sample Identification | Newark Flex Cycles | Suter Test Results |
| --- | --- | --- |
| 1-1 | 0 | Pass |
| 1-2 | 40,000 | Pass |
| 1-3 | 50,000 | Pass |
| 1-4 | 60,000 | Pass |
| 1-5 | 70,000 | Pass |

Additional laminate samples were flexed using the Newark Flex Method to 10,000 and 20,000 cycles. A new, unflexed sample (Sample 1-6 in Table 2) and these additional samples were tested using the Chemical Permeation Test. The results are shown below in Table 2. Because the chemical permeation rate changed by less than 15% when comparing the initial sample to the flexed samples, the fabric was deemed to have maintained its chemical resistance after flexing.

TABLE 2

| Sample Identification | Newark Flex Cycles (number) | Chemical Permeation Rate µg/(cm²-min) | % Change From Initial Rate |
|---|---|---|---|
| 1-6 | 0 | 0.99 | — |
| 1-7 | 10,000 | 0.90 | −9.1% |
| 1-8 | 20,000 | 0.93 | −6.1% |

Additional samples were tested using the Grab Break Strength Test. The result was 57.8 pounds force (lbf) in the warp direction and 94.7 lbf in the fill direction. The break strength result can be divided by the fabric weight to provide a strength to weight ratio in the units of (lbf-yd²)/ounce. The measurements show a strength to weight ratio of 12.8 (lbf-yd²)/ounce in the warp direction and 21.0 (lbf-yd²)/ounce in the fill direction.

Additional samples were abraded using the Abrasion Method up to 1350 cycles. The samples were then tested using the Suter Test for Liquidproof Fabrics. The results are shown below in Table 3. As indicated, the abraded samples showed no change when measured using the Suter Test for Liquidproof Fabrics.

TABLE 3

| Sample Identification | Abrasion Cycles (number) | Suter Test Results |
|---|---|---|
| 1-9 | 300 | Pass |
| 1-10 | 750 | Pass |
| 1-11 | 900 | Pass |
| 1-12 | 1050 | Pass |
| 1-13 | 1350 | Pass |

Example 2A

A laminate was formed comprising a barrier membrane sandwiched between two textile layers. The barrier membrane was made from polytetrafluoroethylene and is available from W. L. Gore & Associates, Inc. as part number 10158737. The barrier membrane, which has a thickness of about 0.0018 inches, is resistant to permeation of liquids and vapors. This membrane was laminated on both sides, using a continuous layer of moisture curable polyurethane adhesive in the same manner as described in Example 1, but with an adhesive laydown thickness of approximately 0.00075 inches, to a woven textile layer weighing about 2.8 ounces per square yard. The textile was made from yarns comprising a core of fiberglass and nylon wrapped with a sheath comprising modacrylic and polyester (Inman Mills part number 4-7001-114). The laminate weighed about 8.0 ounces per square yard.

Laminate samples were flexed using the Newark Flex Method from 40,000 to 70,000 cycles. A new, unflexed sample (Sample 2A-1 in Table 4) and the flexed samples were tested using the Suter Test for Liquidproof Fabrics. The results are shown below in Table 4. As indicated, the flexed samples showed no change when measured using the Suter Test for Liquidproof Fabrics.

TABLE 4

| Sample Identification | Newark Flex Cycles | Suter Test Results |
|---|---|---|
| 2A-1 | 0 | Pass |
| 2A-2 | 40,000 | Pass |
| 2A-3 | 50,000 | Pass |
| 2A-4 | 60,000 | Pass |
| 2A-5 | 70,000 | Pass |

Additional laminate samples were tested using the Grab Break Strength Test. The result was 107.0 lbf in the warp direction and 135 lbf in the fill direction. The break strength result can be divided by the fabric weight to provide a strength to weight ratio in the units of (lbf-yd²)/ounce. The measurements show a strength to weight ratio of 13.4(lbf-yd²)/ounce in the warp direction and 16.9 (lbf-yd²)/ounce in the fill direction.

Example 2B

A laminate was made similar to example 2A, but with an adhesive laydown thickness of approximately 0.0005 inches and using a woven textile weighing about 2.5 ounces per square yard and having a coverage factor of about 1086 on each side (Inman Mills part number A-2948-114). The textile was similarly made from yarns comprising a core of fiberglass and nylon wrapped with a sheath comprising modacrylic and polyester. The laminate weighed about 7.2 ounces per square yard.

Additional laminate samples were tested using the Vertical Flame Test. The average after-flame of the samples was 0 seconds, the average after-glow was 1.2 seconds, and the average char length was 0.125 inches. Additionally, no melting or dripping was observed. Accordingly, the sample was determined to be flame resistant.

Example 3

A laminate was formed comprising a barrier membrane laminated to a textile layer. The barrier membrane was made from polytetrafluoroethylene and is available from W. L. Gore & Associates, Inc. as part number 10158737. This membrane was laminated on one side to a woven textile layer weighing about 2.5 ounces per square yard. The membrane was affixed to the textile layer by gravure printing a dot pattern of moisture curable polyurethane adhesive, prepared according to the teachings of U.S. Pat. No. 4,532,316, covering approximately 40% of the membrane surface. The two layers were pressed together in a nip roll, then passed over a heated roll. The textile was made from yarns comprising a core of fiberglass and nylon wrapped with a sheath comprising modacrylic and polyester (Inman Mills part number A-2948-114). The laminate weighed about 4.2 ounces per square yard.

Laminate samples were flexed using the Newark Flex Method from 40,000 to 70,000 cycles. An unflexed sample (Sample 3-1 in Table 5) and the flexed samples were tested using the Suter Test for Liquidproof Fabrics. The results are shown below in Table 5. As indicated the flexed samples showed no change in when measured using the Suter Test for Liquidproof Fabrics.

TABLE 5

| Sample Identification | Newark Flex Cycles | Suter Test Results |
|---|---|---|
| 3-1 | 0 | Pass |
| 3-2 | 40,000 | Pass |
| 3-3 | 50,000 | Pass |
| 3-4 | 60,000 | Pass |
| 3-5 | 70,000 | Pass |

Additional laminate samples were flexed using the Newark Flex Method to 10,000 and 20,000 cycles. A new, unflexed sample (Sample 3-6 in Table 6) and these additional samples were tested using the Chemical Permeation Test. The results are shown below in Table 6.

TABLE 6

| Sample Identification | Newark Flex Cycles (number) | Chemical Permeation Rate $\mu g/(cm^2\text{-}min)$ | % Change From Initial Rate |
|---|---|---|---|
| 3-6 | 0 | 0.92 | — |
| 3-7 | 10,000 | 0.89 | -3.3% |
| 3-8 | 20,000 | 0.92 | 0% |

Example 4

A laminate was formed comprising a composite barrier membrane laminated to a textile layer. The composite barrier membrane was a composite of microporous polytetrafluoroethylene (PTFE) membrane coated with a polyurethane, prepared according to U.S. Pat. No. 4,194,041 using a breathable, nonporous polyurethane coating on the PTFE. This membrane was laminated on one side, using the process described in Example 3, to a woven textile layer weighing about 2.5 ounces per square yard (Inman Mills part number A-2948-114). The textile was made from yarns comprising a core of fiberglass and nylon wrapped with a sheath comprising modacrylic and polyester.

Laminate samples were flexed using the Newark Flex Method from 10,000 to 70,000 cycles. A new, unflexed sample (Sample 4-1 in Table 7) and the flexed samples were tested using the Suter Test for Liquidproof Fabrics. The results are shown below in Table 7. As indicated, the flexed samples showed no change when measured using the Suter Test for Liquidproof Fabrics.

TABLE 7

| Sample Identification | Newark Flex Cycles | Suter Test Results |
|---|---|---|
| 4-1 | 0 | Pass |
| 4-2 | 10,000 | Pass |
| 4-3 | 20,000 | Pass |
| 4-4 | 30,000 | Pass |
| 4-5 | 40,000 | Pass |
| 4-6 | 50,000 | Pass |
| 4-7 | 60,000 | Pass |
| 4-8 | 70,000 | Pass |

Example 5

A laminate was formed comprising a barrier membrane sandwiched between two textile layers. The barrier membrane was made from a water vapor permeable, microporous polytetrafluoroethylene (PTFE) membrane with a density of 0.53 g/cc and having a thickness of 0.0021 inches (W. L. Gore & Associates, Elkton, Md.). This membrane was laminated on both sides, using a nonwoven hot-melt adhesive web (Part number PA1541 from Spunfab, Ltd of Cuyahoga Falls, Ohio), to a woven textile layer weighing about 4.5 ounces per square yard (Inman Mills Part Number A-7014-114). The textile was made from yarns comprising a core of fiberglass and nylon wrapped with a sheath comprising modacrylic and polyester. The layers were stacked in the following order: Textile, hot-melt adhesive web, barrier membrane, hot-melt adhesive web, textile. Heat at 350° F. and pressure were applied to the stacked layers using a heated press for 10 seconds to form a laminate.

Example 6

A laminate was formed comprising a barrier membrane laminated to a textile layer. The barrier membrane was made from a water vapor permeable, microporous polytetrafluoroethylene (PTFE) membrane with a density of 0.51 g/cc and having a thickness of 0.0042 inches (W. L. Gore & Associates, Elkton, Md.). This membrane was laminated, using a nonwoven hot-melt adhesive web (Part number PA1541 from Spunfab, Ltd), to a woven textile layer weighing about 5.8 ounces per square yard (Inman Mills part number 4-7939-114.). The textile was made from yarns comprising a core of fiberglass and nylon wrapped with a sheath comprising Basofil® Fiber (melamine) and polyester. Heat at 350° F. and pressure were applied to the stacked layers using a heated press for 10 seconds to form a laminate.

Example 7

A laminate was formed comprising a barrier membrane sandwiched between two textile layers. The barrier membrane was made from a water vapor permeable, microporous polytetrafluoroethylene (PTFE) membrane with a density of 0.43 g/cc and having a thickness of 0.0004 inches (W. L. Gore & Associates, Elkton, Md.). This membrane was laminated, using a nonwoven hot-melt adhesive web (Part number PA1541 from Spunfab, Ltd) to a woven textile layer weighing about 4.9 ounces per square yard (Inman Mills part number 4-2839-114). The textile was made from yarns comprising a core of fiberglass and nylon wrapped with a sheath comprising Basofil® Fiber (melamine) and polyester. Heat at 350° F. and pressure were applied to the stacked layers using a heated press for 10 seconds to form a laminate.

Example 8

A laminate was formed comprising a barrier membrane laminated to a textile layer. The barrier membrane was made from a water vapor impermeable polytetrafluoroethylene (PTFE) membrane available from W. L. Gore & Associates, Inc. as part number 10291233. The thickness of the barrier membrane was 0.0021 inches. This membrane was laminated, using a nonwoven hot-melt adhesive web (Part number PA1541 from Spunfab, Ltd), to a woven textile layer weighing about 2.5 ounces per square yard. The textile was made from yarns comprising a core of fiberglass and nylon wrapped with a sheath comprising modacrylic and polyester (Inman Mills part number A-2948-114). Heat at 350° F. and pressure were applied to the stacked layers using a heated press for 10 seconds to form a laminate.

Example 9

A laminate was formed comprising a barrier membrane laminated to a textile layer. The barrier membrane was made from 0.0085 inch thick, polyurethane film available from Deerfield Urethanes, Whately, Mass., as part number PT9700. This membrane was laminated to the textile by the application of heat at 350° F. and pressure for 10 seconds using a heat press. The textile, weighing 2.5 ounces per square yard, was made from yarns comprising a core of fiberglass and nylon wrapped with a sheath comprising modacrylic and polyester (Inman Mills part number A-2948-114).

Example 10

A laminate was formed comprising a barrier membrane laminated to a textile layer. The barrier membrane was made from 0.002 inch thick polyvinylidene fluoride (PVDF) film available from Atofina Chemicals, Inc, Philadelphia, Pa. This membrane was laminated to the textile by the application of heat at 350° F. and pressure for 10 seconds using a heat press. The textile, weighing 2.5 ounces per square yard, was made from yarns comprising a core of fiberglass and nylon wrapped with a sheath comprising modacrylic and polyester (Inman Mills part number A-2948-114).

Example 11

A laminate was formed comprising a barrier membrane laminated to a textile layer. The barrier membrane was made from a 0.0005 inch thick, perfluoroalkoxy (PFA) film and is available from E. I. du Pont de Nemours and Company, Wilmington, Del. This membrane was laminated on one side, using a continuous layer of Deerfield PT9700 hot-melt polyurethane, to a woven textile layer weighing about 2.5 ounces per square yard. The textile was made from yarns comprising a core of fiberglass and nylon wrapped with a sheath comprising modacrylic and (Inman Mills part number A-2948-114).

Example 12

A laminate was formed comprising a barrier membrane laminated to a textile layer. The barrier membrane was made from a 0.0015 inch thick, polyvinyl fluoride (PVF) film and is available from E. I. du Pont de Nemours and Company, Wilmington, Del. This membrane was laminated on one side, using 3M Super 77 Multipurpose Adhesive, to a woven textile layer weighing about 2.5 ounces per square yard. The textile was made from yarns comprising a core of fiberglass and nylon wrapped with a sheath comprising modacrylic and (Inman Mills part number A-2948-114).

Example 13

A liquidproof seam was made from laminate panels formed in accordance with Example 2B. Two panels having rough dimensions of 6 inches by 28 inches were joined along each panel edge with a 0.25 inch seam allowance using a Juki DLM-5200N sewing machine set to 8 stitches per inch. A 1 inch wide seam tape (GORE SEAM® Seam tape obtained from W. L. Gore & Associates, Inc.), having a hot melt polyurethane adhesive, was then applied over the seam and sewn edges by heating the seam tape to a temperature sufficient to melt the polyurethane adhesive and passing the tape and seam through the nip of a pair of pressure rollers in order to squeeze the molten adhesive onto the barrier membrane surface so as to ensure good bonding of the tape to the surface.

The resulting seam was tested using the Suter Test for Liquidproof fabrics where the seam was centered in the test fixture with the liquid applied to the opposite side of the fabric as the seam tape. The seam was determined to be liquidproof when tested at 1 psig for 3 minutes.

Example 14

Figure 2:
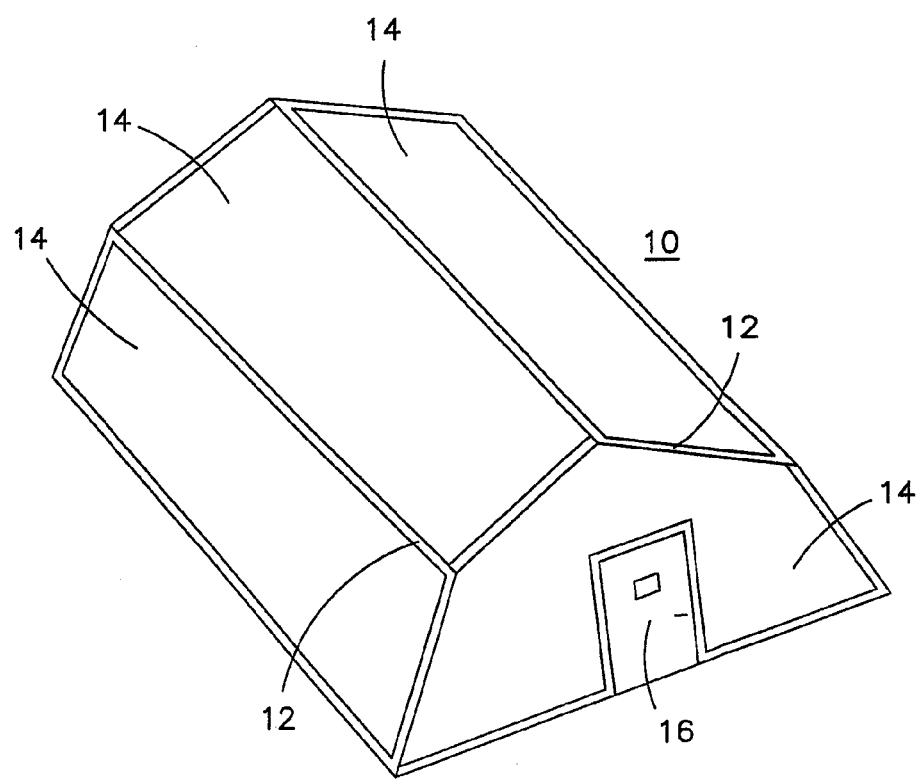
FIG. 2 shows a perspective view of a tent of the present invention formed in accordance with Example 15.

A fabric tent 10 incorporating an aluminum door 16 as shown in FIG. 2 was constructed using the materials and techniques from Example 13. Panels of laminate 14 were cut according to an existing tent design. The panels 14 were joined by sewing, and items such as zippers and grommets (not shown) were attached for use with the tent frame. The seams were sealed as described in Example 13 to form sealed seams 12, thereby forming a liquidproof enclosure capable of preventing liquid and chemical penetration.

COMPARATIVE EXAMPLES

Comparative Example 15

A laminate was formed comprising a barrier membrane laminated to a textile layer. The barrier membrane was made from a non-breathable polytetrafluoroethylene available from W. L. Gore & Associates, Elkton, Md. as part number 10158737. The barrier membrane, which has a thickness of about 0.0018 inches, is resistant to permeation of liquids and vapors. This membrane was laminated on one side, in a manner generally described by U.S. Pat. No. 5,026,591, using a continuous layer of hot melt, moisture curable polyurethane adhesive, prepared according to the teachings of U.S. Pat. No. 4,532,316, with a laydown thickness of approximately 0.00075 inches, to a woven textile layer weighing about 2.8 ounces per square yard. The textile was made from yarns comprising fiberglass (Style 1674 available from BGF Industries, Greensboro, N.C.). The resulting laminate weighed about 4.8 ounces per square yard.

Laminate samples were flexed using the Newark Flex Method from 3,333, to 13,333 cycles. A new, unflexed sample (Comparative Sample 15-1 in Table 8) and the flexed samples were tested using the Suter Test for Liquidproof Fabrics. The results are shown below in Table 8.

TABLE 8

| Comparative Sample Identification | Newark Flex Cycles | Suter Test Results |
|---|---|---|
| 15-1 | 0 | Pass |
| 15-2 | 3,333 | Pass |
| 15-3 | 6,666 | Fail |
| 15-4 | 10,000 | Fail |
| 15-5 | 13,333 | Fail |

Additional laminate samples were flexed using the Newark Flex Method to 10,000 and 20,000 cycles. A new, unflexed sample (Sample 15-6 in Table 9) and these additional samples were tested using the Chemical Permeation Test. The results are shown below in Table 9.

TABLE 9

| Comparative Sample Identification | Newark Flex Cycles (number) | Chemical Permeation Rate μg/(cm²-min) | % Change From Initial Rate |
|---|---|---|---|
| 15-6 | 0 | 1.36 | — |
| 15-7 | 10,000 | 3.51 | 158.1% |
| 15-8 | 20,000 | 2.36 | 73.5% |

Additional samples were abraded using the Abrasion Method up to 300 cycles. The samples were then tested using the Suter Test for Liquidproof Fabrics. The results are shown below in Table 10.

TABLE 10

| Comparative Sample Identification | Abrasion Cycles (number) | Suter Test Results |
|---|---|---|
| 15-9 | 50 | Pass |
| 15-10 | 150 | Fail |
| 15-11 | 300 | Fail |

Comparative Example 16

A laminate was formed comprising a barrier membrane sandwiched between two textile layers. The barrier membrane was made from a non-breathable polytetrafluoroethylene available from W. L. Gore & Associates, Inc. as part number 10158737. The barrier membrane, which has a thickness of about 0.0018 inches, is resistant to permeation of liquids and vapors. This membrane was laminated on one side, in a manner generally described by U.S. Pat. No. 5,026,591, using a continuous layer of hot melt, moisture curable polyurethane adhesive, prepared according to the teachings of U.S. Pat. No. 4,532,316, with a laydown thickness of approximately 0.00075 inches, to a woven textile layer weighing about 2.8 ounces per square yard. The textile was made from yarns comprising fiberglass (Style 1674 available from BGF Industries, Greensboro, N.C.). The resulting laminate weighed about 8.4 ounces per square yard.

Laminate samples were flexed using the Newark Flex Method from 3,333 to 13,333 cycles. A new, unflexed sample (Comparative Sample 16-1 in Table 11) and the flexed samples were tested using the Suter Test for Liquidproof Fabrics. The results are shown in Table 11.

TABLE 11

| Comparative Sample Identification | Newark Flex Cycles | Suter Test Results |
|---|---|---|
| 16-1 | 0 | Pass |
| 16-2 | 3,333 | Fail |
| 16-3 | 6,666 | Fail |
| 16-4 | 10,000 | Fail |
| 16-5 | 13,333 | Fail |

Comparative Example 17

A laminate was formed comprising a barrier membrane laminated to a textile layer. The barrier membrane was made from polytetrafluoroethylene and is available from W. L. Gore & Associates, Inc. as part number 10158737. This membrane was laminated on one side to a woven textile layer weighing about 2.8 ounces per square yard and made from yarns comprising fiberglass (Style 1674 available from BGF Industries, Greensboro, N.C.). The membrane was affixed to the textile layer by gravure printing a dot pattern of moisture curable polyurethane adhesive, prepared according to the teachings of U.S. Pat. No. 4,532,316, covering approximately 40% of the membrane surface. The two layers were pressed together in a nip roll, then passed over a heated roll. The laminate weighed about 4.2 ounces per square yard.

Laminate samples were flexed using the Newark Flex Method from 3,333 to 13,333 cycles. A new, unflexed sample (Comparative Sample 17-1 in Table 12) and the flexed samples were tested using the Suter Test for Liquidproof Fabrics. The results are shown below in Table 12.

TABLE 12

| Comparative Sample Identification | Newark Flex Cycles | Suter Test Results |
|---|---|---|
| 17-1 | 0 | Pass |
| 17-2 | 3,333 | Fail |
| 17-3 | 6,666 | Fail |
| 17-4 | 10,000 | Fail |
| 17-5 | 13,333 | Fail |

Additional laminate samples were flexed using the Newark Flex Method to 10,000 and 20,000 cycles. A new, unflexed sample (Comparative Sample 17-6 in Table 13) and these additional comparative samples were tested using the Chemical Permeation Test. The results are shown below in Table 13.

TABLE 13

| Comparative Sample Identification | Newark Flex Cycles (number) | Chemical Permeation Rate μg/(cm²-min) | % Change From Initial Rate |
|---|---|---|---|
| 17-6 | 0 | 1.20 | — |
| 17-7 | 10,000 | 16.10 | 1241.7% |
| 17-8 | 20,000 | 4.58 | 281.7% |

Comparative Example 18

A laminate was formed comprising a composite barrier membrane laminated to a textile layer. The composite barrier membrane was a composite of microporous polytetrafluoroethylene (PTFE) membrane coated with a polyurethane, prepared according to U.S. Pat. No. 4,194,041 using a breathable, nonporous polyurethane coating on the PTFE. This membrane was laminated on one side, using the process described in Example 17, to a woven textile layer weighing about 2.8 ounces per square yard made from yarns comprising fiberglass (Style 1674 available for BGF Industries, Greensboro, N.C.).

Laminate samples were flexed using the Newark Flex Method from 3,333 to 13,333 cycles. A new, unflexed sample and the flexed samples were tested using the Suter Test for Liquidproof Fabrics. The results are shown below in Table 14.

TABLE 14

| Sample Identification | Newark Flex Cycles | Suter Test Results |
|---|---|---|
| 18-1 | 0 | Pass |
| 18-2 | 3,333 | Pass |
| 18-3 | 6,666 | Pass |
| 18-4 | 10,000 | Fail |
| 18-5 | 13,333 | Fail |

We claim:

1. An article comprising
a laminate that is liquidproof after 10,000 flex cycles and has a weight of about 15 oz/yd² or less, comprising
at least one barrier layer; and
at least one textile layer weighing less than 5 oz/yd², comprising yarns having a core comprising fiberglass and a sheath comprising one or more continuous or staple filaments comprising a second material around said core, bonded to the at least one barrier layer.

2. The article of claim 1, wherein said sheath comprises at least one polymer.

3. The article of claim 1, wherein the laminate is liquidproof after 20,000 flex cycles.

4. The article of claim 1, wherein the laminate is liquidproof after 40,000 flex cycles.

5. The article of claim 1, wherein the laminate is liquidproof after 70,000 flex cycles.

6. The article of claim 1, wherein the at least one barrier layer had a thickness of about 100 microns or less.

7. The article of claim 1, wherein the at least one barrier layer had a thickness of about 50 microns or less.

8. The article of claim 1, wherein the at least one barrier layer had a thickness of about 20 microns or less.

9. The article of claim 1, wherein the laminate has a strength/weight ratio greater than 13:1.

10. The article of claim 1, wherein the laminate has a strength/weight ratio greater than 17:1.

11. The article of claim 1, wherein the laminate has a strength/weight ratio greater than 25:1.

12. The article of claim 1, wherein the at least one textile layer comprises a woven construction.

13. The article of claim 1, wherein the at least one textile layer comprises a knit construction.

14. The article of claim 1, wherein the weight of the laminate is about 10 oz/yd2 or less.

15. The article of claim 1, wherein the weight of the laminate is about 8 oz/yd2 or less.

16. The article of claim 1, wherein the at least one barrier layer comprises a fluoropolymer.

17. The article of claim 1, wherein the at least one barrier layer comprises expanded PTFE.

18. The article of claim 1, wherein the at least one barrier layer is breathable.

19. The article of claim 1, wherein the at least one barrier layer is non-breathable.

20. The article of claim 1, wherein the at least one textile layer has a cover factor of about 1800 or less.

21. The article of claim 1, wherein the at least one textile layer has a cover factor of about 1400 or less.

22. The article of claim 1 in the form of a shelter liner.

23. The article of claim 1 in the form of a garment.

24. The article of claim 1, wherein the laminate is flame resistant.

25. An article comprising
a laminate that has a weight of about 15 oz/yd² or less comprising
at least one PTFE barrier layer;
a polyurethane adhesive; and
at least one textile layer consisting essentially of yarns having a core comprising fiberglass and a sheath comprising one or more continuous or staple filaments comprising a second material around said core, bonded to the PTFE barrier layer by the polyurethane adhesive,
wherein the laminate maintains its resistance to permeation of chemical vapors after 10,000 flex cycles.

26. The article of claim 25, wherein the laminate maintains its resistance to permeation of chemical vapors after 20,000 flex cycles.

27. The article of claim 25, wherein said sheath comprises at least one polymer.

28. The article of claim 25, wherein the laminate is liquidproof after 20,000 flex cycles.

29. The article of claim 25, wherein the laminate is liquidproof after 40,000 flex cycles.

30. The article of claim 25, wherein the laminate is liquidproof after 70,000 flex cycles.

31. The article of claim 25, wherein the at least one barrier layer had a thickness of about 100 microns or less.

32. The article of claim 25, wherein the at least one barrier layer had a thickness of about 50 microns or less.

33. The article of claim 25, wherein the at least one barrier layer had a thickness of about 20 microns or less.

34. The article of claim 25, wherein the laminate has a strength/weight ratio greater than 13:1.

35. The article of claim 25, wherein the laminate has a strength/weight ratio greater than 17:1.

36. The article of claim 25, wherein the laminate has a strength/weight ratio greater than 25:1.

37. The article of claim 25, wherein the at least one textile layer comprises a woven construction.

38. The article of claim 25, wherein the at least one textile layer comprises a knit construction.

39. The article of claim 25, wherein the weight of the laminate is about 10 oz/yd2 or less.

40. The article of claim 25, wherein the weight of the laminate is about 8 oz/yd2 or less.

41. The article of claim 25, wherein the at least one barrier layer comprises a fluoropolymer.

42. The article of claim 25, wherein the at least one barrier layer comprises expanded PTFE.

43. The article of claim 25, wherein the at least one barrier layer is breathable.

44. The article of claim 25, wherein the at least one barrier layer is non-breathable.

45. The article of claim 25, wherein the at least one textile layer has a cover factor of about 1800 or less.

46. The article of claim 25, wherein the at least one textile layer has a cover factor of about 1400 or less.

47. The article of claim 25, wherein the laminate is liquidproof after 300 abrasion cycles.

48. The article of claim 25, wherein the laminate is liquidproof after 1350 abrasion cycles.

49. The article of claim 25, in the form of a shelter liner.

50. The article of claim 25, in the form of a garment.

51. An article comprising
a first laminate panel and a second laminate panel, each said laminate panel having a laminate weight of about 15 oz/yd² or less comprising at least one barrier layer and at least one textile layer consisting essentially of yarns having a core comprising fiberglass and a sheath comprising a second material around said core bonded to the at least one barrier layer; and
at least one liquidproof seam joining together the at least two laminate panels.

52. An article comprising
a laminate consisting essentially of
at least one barrier layer comprising expanded PTFE, an adhesive layer, and
at least one textile layer comprising yarns having a core comprising fiberglass and a sheath comprising modacrylic around said core wherein the textile is bonded to the expanded PTFE by the adhesive layer, wherein said laminate has a weight of about 15 oz/yd² less and is liquidproof after 20,000 flex cycles.

53. The article of claim 1, wherein the sheath comprises one or more continuous filaments wrapped or oriented around the core providing at least partial coverage of the core.

54. The article of claim 1, wherein the sheath comprises one or more staple filaments wrapped or oriented around the core providing at least partial coverage of the core.

55. An article comprising
   a laminate comprising
     a barrier layer and
     at least one textile layer on each side of the barrier layer, the at least one textile layer comprising yarns having a core comprising fiberglass and a sheath comprising one or more continuous or staple filaments comprising a second material around said core,
   wherein the laminate weighs less than 10 oz/yd² and wherein the laminate is liquidproof after 10,000 flex cycles.

56. The article of claim 25, wherein the sheath comprises one or more continuous filaments wrapped or oriented around the core providing at least partial coverage of the core.

57. The article of claim 25, wherein the sheath comprises one or more staple filaments wrapped or oriented around the core providing at least partial coverage of the core.

* * * * *

UNITED STATES PATENT AND TRADEMARK OFFICE
CERTIFICATE OF CORRECTION

PATENT NO. : 7,682,997 B2
APPLICATION NO. : 11/187399
DATED : March 23, 2010
INVENTOR(S) : Altman et al.

It is certified that error appears in the above-identified patent and that said Letters Patent is hereby corrected as shown below:

Column 8, Line 66: change "change in when" to --change when--

Column 11, Line 42: change "and (Inman" to --and polyester (Inman--

Column 11, Line 54: change "and (Inman" to --and polyester (Inman--

Column 15, Line 20: change "layer had a" to --layer has a--

Column 15, Line 22: change "layer had a" to --layer has a--

Column 15, Line 24: change "layer had a" to --layer has a--

Column 15, Line 36: change "oz/yd2 or" to --oz/yd or--

Column 15, Line 38: change "oz/yd2 or" to --oz/yd or--

Column 16, Line 13: change "layer had a" to --layer has a--

Column 16,y Line 15: change "layer had a" to --layer has a--

Column 16, Line 17: change "layer had a" to --layer has a--

Column 16, Line 29: change "oz/yd2 or" to --oz/yd or--

Column 16, Line 31: change "oz/yd2 or" to --oz/yd or--

Column 17, Line 1: change "oz/yd2 less" to --oz/yd or less--

Signed and Sealed this

Twenty-fourth Day of August, 2010

David J. Kappos
*Director of the United States Patent and Trademark Office*